(12) United States Patent
Hoareau et al.

(10) Patent No.: US 9,714,012 B1
(45) Date of Patent: Jul. 25, 2017

(54) POWER SOURCE ELEMENT REPLACEMENT DURING VEHICLE OPERATION

(71) Applicant: INTERNATIONAL BUSINESS MACHINES CORPORATION, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/004,219

(22) Filed: Jan. 22, 2016

(51) Int. Cl.
  *B60S 5/06* (2006.01)
  *G05D 1/02* (2006.01)
  (Continued)

(52) U.S. Cl.
  CPC ............. *B60S 5/06* (2013.01); *B64C 39/024* (2013.01); *G05D 1/0202* (2013.01);
  (Continued)

(58) Field of Classification Search
  USPC ......................................................... 701/22
  See application file for complete search history.

(56) References Cited

U.S. PATENT DOCUMENTS 4,166,359 A * 9/1979 Domokos ............. G04C 10/00
  368/309

5,763,116 A * 6/1998 Lapinski ............. H01M 2/1077
  429/159

(Continued)

FOREIGN PATENT DOCUMENTS

| EP | 1094001 | 9/2001 | |
|---|---|---|---|
| FR | KR 20100028502 A * | 3/2010 | ............. B01J 23/85 |
| KR | 20090082957 A * | 8/2009 | |

OTHER PUBLICATIONS

ADCECR-WENNO:T—2009-G35032 for WO 2009039454 A1 to Agassi.*

(Continued)

*Primary Examiner* — Jean-Paul Cass
(74) *Attorney, Agent, or Firm* — Schmeiser, Olsen & Watts; John R. Pivnichny (57) ABSTRACT

A method and apparatus for replacing a power source element is provided. The method includes enabling a first vehicle comprising a first power source apparatus comprising a first multiple compartment housing comprising a first plurality of receptacles retaining a first plurality of power source elements, a controller, and a communication interface. The first vehicle receives a notification indicating that a second vehicle requires replacement of a power source element of a second plurality of power source elements within a second power source apparatus of the second vehicle. The first vehicle is directed to a current location of the second vehicle and the first vehicle is docked to the second vehicle. The power source element of the second vehicle is replaced with a fully charged power source element of the first plurality of power source elements from the first vehicle during operation of the first vehicle and the second vehicle.

8 Claims, 9 Drawing Sheets

(51) Int. Cl.
*B64C 39/02* (2006.01)
*H01M 10/42* (2006.01)

(52) U.S. Cl.
CPC ........ *G05D 1/0278* (2013.01); *H01M 10/425* (2013.01); *H01M 10/4207* (2013.01); *B64C 2201/128* (2013.01); *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 6,023,146 A * | 2/2000 | Casale | H01M 2/024 29/623.1 |
| 6,274,950 B1 | 8/2001 | Gottlieb et al. | |
| 6,634,851 B1 * | 10/2003 | Bonora | B25J 9/042 414/744.3 |
| 6,803,678 B2 | 10/2004 | Gottlieb et al. | |
| 6,819,982 B2 | 11/2004 | Doane | |
| 7,379,305 B2 | 5/2008 | Briggs et al. | |
| 8,056,860 B2 | 11/2011 | Small et al. | |
| 8,868,256 B2 | 10/2014 | Waid | |
| 8,899,903 B1 | 12/2014 | Saad et al. | |
| 9,045,218 B2 | 6/2015 | Childress et al. | |
| 9,056,676 B1 | 6/2015 | Wang | |
| 9,139,310 B1 | 9/2015 | Wang | |
| 9,387,928 B1 | 7/2016 | Gentry et al. | |
| 9,434,267 B2 | 9/2016 | Wang et al. | |
| 2005/0077874 A1 | 4/2005 | Nakao | |
| 2007/0148818 A1 | 6/2007 | Williams et al. | |
| 2008/0211309 A1 | 9/2008 | Nolte | |
| 2008/0293277 A1 | 11/2008 | Kumar et al. | |
| 2009/0082957 A1 * | 3/2009 | Agassi | B60L 3/12 701/532 |
| 2009/0276637 A1 | 11/2009 | Coonan et al. | |
| 2011/0027662 A1 | 2/2011 | Nishimura et al. | |
| 2011/0049992 A1 * | 3/2011 | Sant'Anselmo | F03D 9/007 307/64 |
| 2011/0077809 A1 * | 3/2011 | Leary | B60L 11/1824 701/22 |
| 2011/0254503 A1 * | 10/2011 | Widmer | B60L 11/182 320/108 |
| 2012/0189453 A1 | 7/2012 | Curren | |
| 2013/0221741 A1 | 8/2013 | Stanek et al. | |
| 2014/0021923 A1 | 1/2014 | Uchida | |
| 2014/0038007 A1 | 2/2014 | Ahn | |
| 2014/0129059 A1 | 5/2014 | Scarlatti et al. | |
| 2014/0175873 A1 | 6/2014 | Kishimoto et al. | |
| 2014/0178525 A1 | 6/2014 | Babin | |
| 2014/0252848 A1 | 9/2014 | Arumugam | |
| 2014/0303814 A1 | 10/2014 | Burema et al. | |
| 2014/0319272 A1 | 10/2014 | Casado Magaña et al. | |
| 2014/0339371 A1 | 11/2014 | Yates et al. | |
| 2014/0353429 A1 | 12/2014 | Lopez et al. | |
| 2015/0021985 A1 | 1/2015 | Matsuda | |
| 2015/0030387 A1 | 1/2015 | Poustchi | |
| 2015/0035437 A1 * | 2/2015 | Panopoulos | F21V 14/02 315/112 |
| 2015/0042160 A1 | 2/2015 | Matsuda | |
| 2015/0059649 A1 * | 3/2015 | van der Sluis | A01J 5/0175 119/14.08 |
| 2015/0063959 A1 | 3/2015 | Saad et al. | |
| 2015/0120094 A1 | 4/2015 | Kimchi et al. | |
| 2015/0249362 A1 | 9/2015 | Bridgelall et al. | |
| 2015/0321755 A1 | 11/2015 | Martin et al. | |
| 2016/0001883 A1 | 1/2016 | Sanz et al. | |
| 2016/0031564 A1 | 2/2016 | Yates | |
| 2016/0039295 A1 * | 2/2016 | Madurai-Kumar | B60L 11/184 320/109 |
| 2016/0039300 A1 | 2/2016 | Wang et al. | |
| 2016/0039542 A1 | 2/2016 | Wang | |
| 2016/0056510 A1 | 2/2016 | Takeuchi et al. | |
| 2016/0116914 A1 * | 4/2016 | Mucci | G05D 1/0088 701/2 |
| 2016/0144734 A1 | 5/2016 | Wang et al. | |
| 2016/0196756 A1 | 7/2016 | Prakash et al. | |
| 2016/0307448 A1 | 10/2016 | Salnikov et al. | |

OTHER PUBLICATIONS

Wilson, Daniel; Sky-high refueling for UAVs; Phys.Org; Apr. 23, 2015; http://phys.org/; 2 pages.
Wilson, Daniel B., et al.; Guidance and Navigation for UAV Airborne Docking; Retrieved from the Internet Jul. 8, 2015; URL: http://www.roboticsproceedings.org; 9 pages.
Farooqui, Adnan; Parrot AR.Drone 2.0 "Power Edition" Brings 36 Minutes of Flying Time; Ubergizmo.com; Aug. 18, 2013; URL: http://www.ubergizmo.com/2013/08/parott-ar-drone-2-0-power-edition-brings-36-minuted-of-flying-time.htm; Retrieved from the Internet Jul. 29, 2015; 4 pages.
Calculate Flight Time of LiPo Battery; URL: http://www.scoutuav.com/category/guide/power-system/calculate-flight-time/; Retrieved from the Internet Jul. 29, 2015; 1 page.
Dronehacks; 30 minutes flight time for the AR.Drone with Zippy 2200mAh; Aug. 28, 2010; URL: http://dronehacks.com/2010/08/28/30-minutes-flight-time-for-the-ar-drone-with-zippy-ss00mAh/; Retrieved from the Internet Jul. 29, 2015; 1 page.
Toksoz, Tuna et al; Automated Battery Management System for Enabling Multi-Agent Persistent Missions; Aerospace Controls Laboratory—Current and Recent Project Descriptions; URL: http://acl.mit.edu/projects/recharge.htm; Retrieved from the Internet Jul. 29, 2015; 7 pages.
Stone, Maddie; Amazon Can (Finally) Test Its Delivery Drones in the United States; Gizmodo.com; URL: //http://gizmodo.com/amazon-can-finally-test-its-delivery-drones-in-theun-1697124779; Retrieved from the Internet Jul. 29, 2015; 7 pages.
Cochran, Nigel; et al; Automated Refueling for Hovering Robots; URL: http://docslide.us/documents/1-8222011-automated-refueling-for-hovering-robots-nigel-cochran-janine-pizzimenti.html; Retrieved from the Internet Jul. 29, 2015; 1 page.
Jager, Elliot; Domestic Drone Industry Can Boost Economy; Newsmax.com; URL: http://www.newsmax.com/Newsfront/drone-economy-domestic-boost/2013/12/03/id539607/; Retrieved from the Internet Jul. 29, 2015; 6 pages.
The Drones Report: Market forecasts, regulatory barriers, top vendors, and leading commercial applications; Business Insider; URL: http://www.businessinsidercom/uav-or-commercial-drone-market-forcast-2015-2; Retrieved from the Internet Jul. 29, 2015; 3 pages.
Teal Group Predicts Worldwide UAV Market Will Total $91 Billion in Its 2014 UAV Market Profile and Forecast; URL: http://www.tealgroup.com/index.php/about-teal-group-corporation/press-releases/118-2014-uav; Retrieved from the Internet Jul. 29, 2015; 4 pages.
What is the Drone Industry Really Worth; Fortune.com; Mar. 12, 2013; URL: http://fortune.com/2013/03/12/what-is-the-drone-industry-really-worth; Retrieved from the Internet Jul. 29, 2015; 4 pages.
Suzuki, Koji A. O.; et al; Automatic Battery Replacement System for UAVs: Analysis and Design; J Intell Robot Syst; Sep. 9, 2011; 24 pages.
Baguley, Richard; Best Drones 2015; Tom's Guide; Jun. 24, 2015; URL: http"//www.tomesguide.com/us/best-drones,review-2412.html; Retrieved from the Internet Jul. 29, 2015; 13 pages.
Top 6 Best Drones for Sale: The Heavy Power List; Heavy.com; Oct. 20, 2014; URL: http://heavy.com/tech/2014/10/rc-best-drones-for-sale-aerial-photography-camera-surveillance; Retrieved from the Internet Jul. 29, 2015; 33 pages.
Wilbanks, Charles; Drones: A big industry waiting to be born; CBS News, Moneywatch; URL: http://222.cbsnews.com/news/drones-a-big-industry-waiting-to-be-nom/; Retrieved from the Internet Jul. 29, 2015; 7 pages.
Kemper, Paulo F. et al.; UAV Consumable Replenishment: Design Concepts for Automated Service Stations; Journal of Intelligent and Robotic Systems; Mar. 2011; 27 pages.

(56) References Cited

OTHER PUBLICATIONS

Leavitt, Neal; iMedia Connection Blog; Aug. 20, 2014; URL: http://blogs.imediaconnection.com/blog/2014/08/30/up-up-and-away-commercial-drone/; Retrieved from the Internet Jul. 29, 2015; 10 pages.
Office Action (Mail Date Apr. 27, 2016) for U.S. Appl. No. 15/004,327, filed Jan. 22, 2016.
Amendment filed Jul. 27, 2016 in response to Office Action (Mail Date Apr. 27, 2016) for U.S. Appl. No. 15/004,327, filed Jan. 22, 2016.
Final Office Action (Mail Date Aug. 9, 2016) for U.S. Appl. No. 15/004,327, filed Jan. 22, 2016.
Amendment filed Oct. 11, 2016 in response to Final Office Action (Mail Date Aug. 9, 2016) for U.S. Appl. No. 15/004,327, filed Jan. 22, 2016.
Office Action (Mail Date Dec. 27, 2016) for U.S. Appl. No. 15/004,327; Filing Date Jan. 22, 2016; Art Unit 2836; Confirmation No. 3030.
Amendment filed Mar. 27, 2017 in response to Office Action (Mail Date Dec. 27, 2016) for U.S. Appl. No. 15/004,327; Filing Date Jan. 22, 2016; Art Unit 2836; Confirmation No. 3030.

\* cited by examiner

POWER SOURCE ELEMENT REPLACEMENT DURING VEHICLE OPERATION

FIELD

The present invention relates generally to an apparatus for replacing power source elements of a vehicle and in particular to an apparatus and associated method for using a first vehicle to replace power source elements for a second vehicle during operation of both vehicles.

BACKGROUND

Current vehicles requiring power are typically associated with a limited operational time frame. Limited operational time frames typically result in an interruption of current activities thereby preventing completion of operational tasks. Accordingly, there exists a need in the art to overcome at least some of the deficiencies and limitations described herein above.

SUMMARY

A first aspect of the invention provides a vehicle power source replacement method comprising: enabling a first vehicle comprising a power source apparatus and a first power source apparatus attached to the first vehicle, wherein the power source apparatus comprises a plurality of power source elements configured to supply power to the first vehicle independently without requiring power supplied by any other power source element of the plurality of power source elements, wherein the first power source apparatus comprises: a first multiple compartment housing comprising a first plurality of receptacles retaining a first plurality of power source elements within the first plurality of receptacles, a controller connected to the first plurality of power source elements, and a communication interface communicatively coupled to the controller; receiving, by the first vehicle, a notification indicating that a second vehicle requires replacement of at least one power source element of a second plurality of power source elements within a second power source apparatus of the second vehicle, wherein the second plurality of power source elements supply power to the second vehicle independently without requiring power supplied by any other power source of the second plurality of power sources; directing, by the controller in response to the notification, the first vehicle to a current location of the second vehicle; docking the first vehicle to the second vehicle; replacing, by the first vehicle during operation of the first vehicle and the second vehicle, the at least one power source element of the second vehicle with a fully charged power source element of the first plurality of power source elements from the first vehicle.

A second aspect of the invention provides a computer program product, comprising a computer readable hardware storage device storing a computer readable program code, the computer readable program code comprising an algorithm that when executed by a processor implements a vehicle power source replacement method, the method comprising: enabling a first vehicle comprising a power source apparatus and a first power source apparatus attached to the first vehicle, wherein the power source apparatus comprises a plurality of power source elements configured to supply power to the first vehicle independently without requiring power supplied by any other power source element of the plurality of power source elements, wherein the first power source apparatus comprises: a first multiple compartment housing comprising a first plurality of receptacles retaining a first plurality of power source elements within the first plurality of receptacles, a controller connected to the first plurality of power source elements, and a communication interface communicatively coupled to the controller; receiving, by the first vehicle, a notification indicating that a second vehicle requires replacement of at least one power source element of a second plurality of power source elements within a second power source apparatus of the second vehicle, wherein the second plurality of power source elements supply power to the second vehicle independently without requiring power supplied by any other power source of the second plurality of power sources; directing, by the controller in response to the notification, the first vehicle to a current location of the second vehicle; docking the first vehicle to the second vehicle; and replacing, by the first vehicle during operation of the first vehicle and the second vehicle, the at least one power source element of the second vehicle with a fully charged power source element of the first plurality of power source elements from the first vehicle.

A third aspect of the invention provides a vehicle power source apparatus comprising: a multiple compartment housing comprising a fixed outer portion and a rotating portion comprising a plurality of receptacles configured to retain power source elements for supplying power to a vehicle, wherein the multiple compartment housing is configured to be physically attached to the vehicle; a plurality of power source elements within the plurality of receptacles; a controller; and a power source replacement mechanism configured to replace, in response to a command from the controller and during operation of the vehicle and an additional vehicle, a power source element from the additional vehicle with a fully charged power source element of the plurality of power source elements of the vehicle.

The present invention advantageously provides a simple method and associated system capable of supplying power to vehicles.

DETAILED DESCRIPTION

Figure 1:
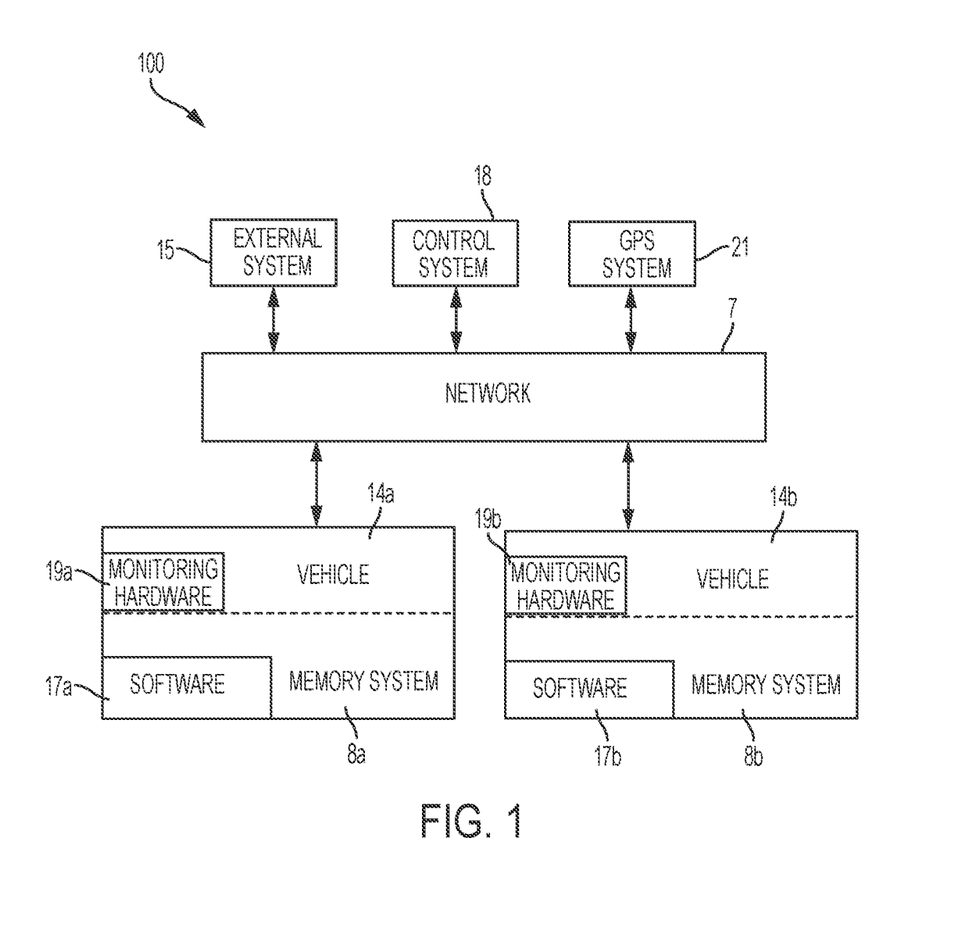
FIG. 1 illustrates a system for replacing power source elements in vehicles during operation of the vehicles, in accordance with embodiments of the present invention.
Figure 6:
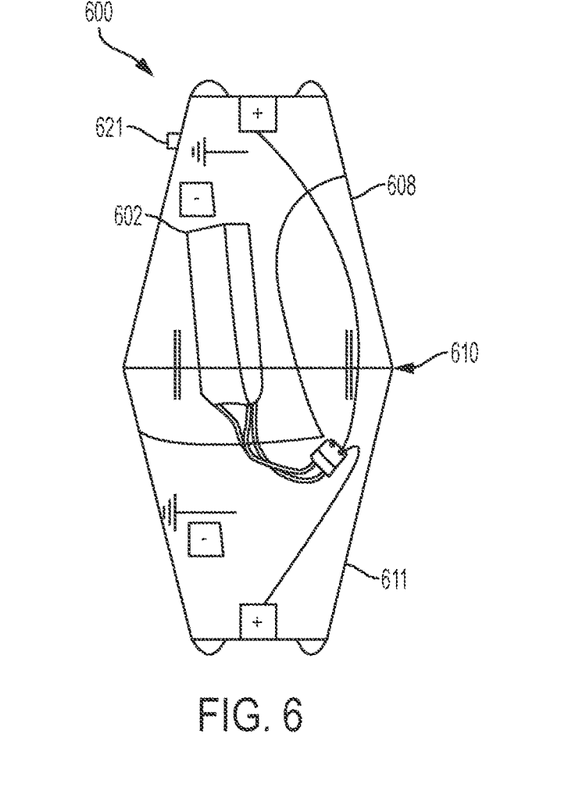
FIG. 6 illustrates a power source element residing within a power source capsule, in accordance with embodiments of the present invention.

FIG. 1 illustrates a system 100 for replacing power source elements in a vehicle 14*a* during operation of vehicle 14*a*, in accordance with embodiments of the present invention. System 100 enables a process for utilizing multiple power source elements for 14*a* vehicle such that vehicle 14*a* includes a multiple compartment housing (e.g., at a center of gravity of the vehicle retaining the multiple power source elements) such that the power source elements may be replaced and exchanged with fully charged power source elements (from a vehicle 14*b*) during operation of the vehicles 14*a* and 14*b*. Vehicles 14*a* and 14*b* may each comprise any vehicle that does not require a human operator to be located within the vehicles 14*a* and 14*b* such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicle 14 to know it's location and self-determine a route to join with a second vehicle dynamically), a pre-programmed vehicle, etc. Alternatively, vehicles 14*a* and 14*b* may comprise any type of vehicle that includes a human operator located within vehicles 14*a* and 14*b* (e.g., an aircraft, an automobile, a boat or ship, a train, etc.). Vehicles 14*a* and 14*b* may include, inter alia, an aerial vehicle, a land based vehicle, a marine (water) based vehicle, etc. Power source elements may include any type of (portable) power source element including, inter alia, a battery, a fuel cell, etc. A power source element may comprise a power source (e.g., a battery) placed within a power source capsule (e.g., as illustrated in FIG. 6). Alternatively, a power source element may comprise a specially shaped power source (e.g., a battery) without the power source capsule.

Figure 7:
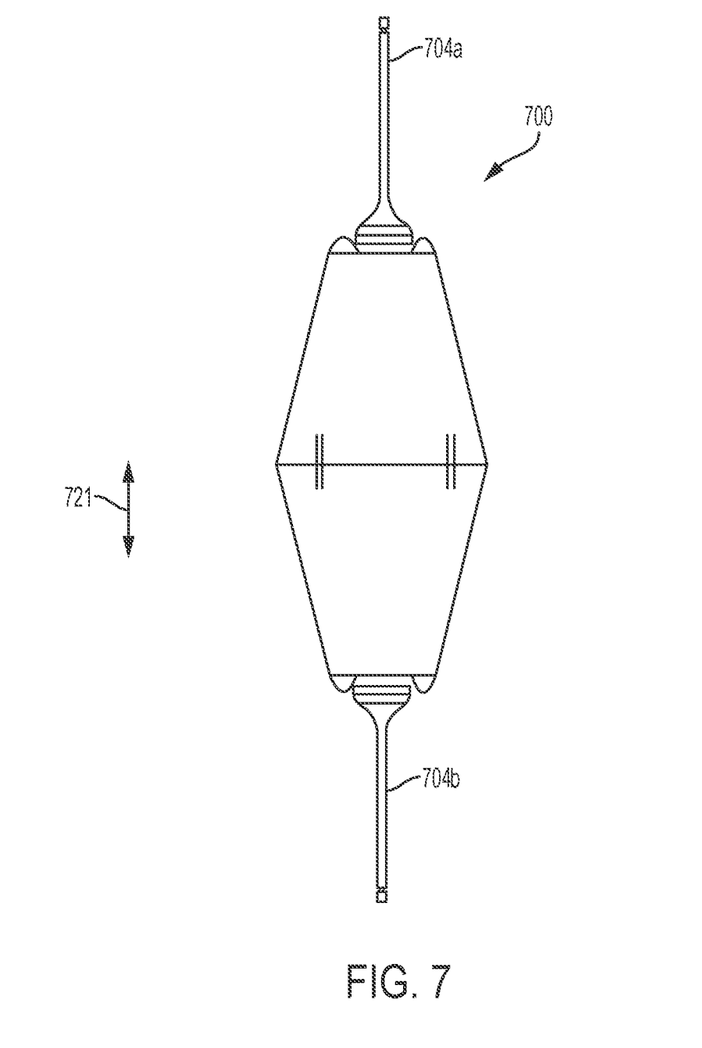
FIG. 7 illustrates a power source element/power source capsule, in accordance with embodiments of the present invention.
Figure 8:
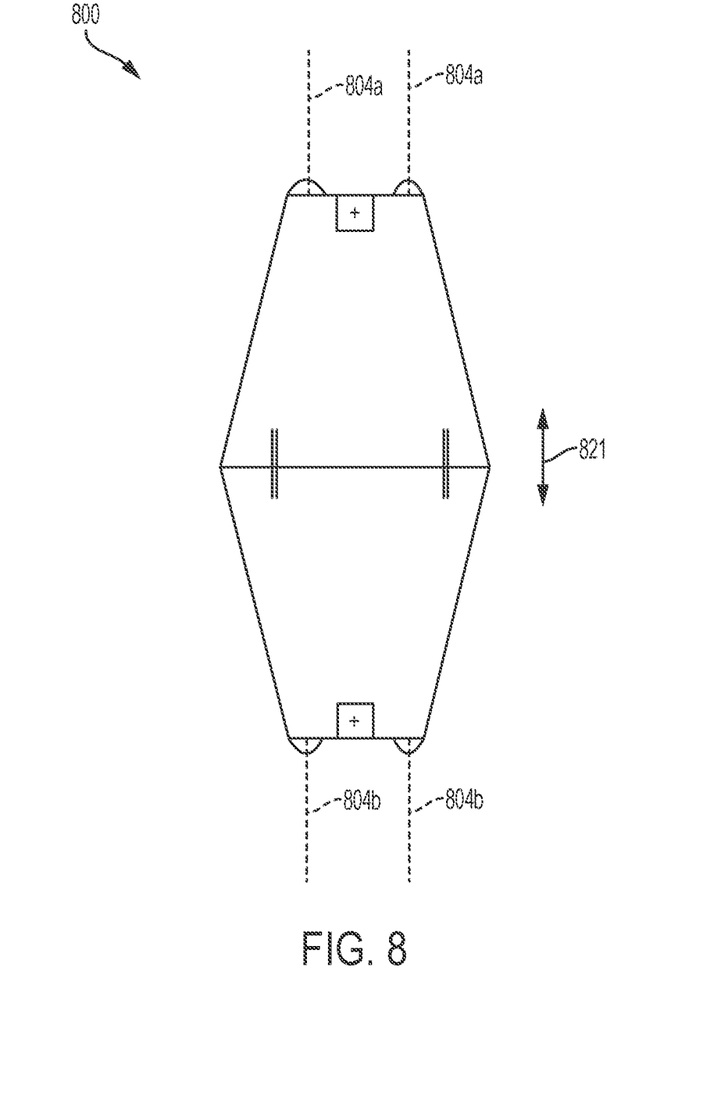
FIG. 8 illustrates an alternative power source element/power source capsule, in accordance with embodiments of the present invention.

System 100 allows vehicle 14*a* to utilize a series of power source elements (e.g., power supplies) to power vehicle 14*a* for operation. System 100 enables vehicle 14*a* to draw power (e.g., a direct current voltage) from multiple power source elements that would extend an operational (e.g., flying) time, range, and delivery capacity for vehicle 14*a*. Additionally, system 100 enables one or more power source elements (optionally comprising a specified shape) to be used as replacement power source elements (the replacement power source elements may be located in a separate multi compartment housing from a housing retaining power source elements for powering vehicle 14*a* as described with respect to FIG. 5, infra) to replace discharged power source elements of vehicle 14*b* during operation of vehicles 14*a* and 14*b*. For example, a power source element may be guided (from a multi compartment housing of vehicle 14*a*) into an open chamber(s) or receptacle(s) in a multiple compartment power source housing of vehicle 14*b*. A conical power source element shape (i.e., tapered on both ends as illustrated in FIG. 6-8) enable multiple vehicle in-operation power source element exchange such that when inserting or extracting power source elements under in-operation conditions (e.g., vibrations, wind, inertia, etc.), an opening of a power source receptacle comprise a be greater size than an insertion end of an associated power source element to compensate for in-operation conditions. Additionally, a power source element (or associated housing) may comprise a guide hole design (an alignment mechanism) to allow docking and alignment via a tapered pin (an alignment mechanism) alignment method for compatible units. A power source element may comprise any shape such that a housing may encapsulate industry standard power source elements or any newly manufactured power source element designs.

System 100 of FIG. 1 includes an external system 15, a vehicle control system 18, and a GPS system 21 connected through a network to a vehicle 14*a* and a vehicle 14*b*. Vehicle 14*a* retrieves/generates GPS coordinates based data (from GPS system 21) in response to a determination that vehicle 14*b* requires replacement of at least one power source element. The GPS coordinates based data are analyzed (by external system 15) to determine exact coordinates for vehicle 14*b* requiring replacement of at least one power source element. Vehicle 14*a* and 14*b*, external system 15, control system 18, and GPS system 21 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicle 14*a* and 14*b*, external system 15, control system 18, and GPS system 21 may each comprise a specialized hardware device comprising specialized (non-generic) hardware and circuitry (i.e., specialized discrete non-generic analog, digital, and logic based circuitry) for executing a process described with respect to FIG. 4. The specialized discrete non-generic analog, digital, and logic based circuitry may include proprietary specially designed components (e.g., a specialized integrated circuit designed for only implementing an automated process for enabling a process for replacing power source elements in vehicle 14*b* during operation of the vehicles 14*a* and 14*b*. Vehicle 14*a* includes a memory system 8*a*, software 17*a*, and dedicated monitoring hardware 19*a* (all sensors and associated monitoring hardware for enabling software 17*a* to execute a process for replacing power source elements in a vehicle during operation of the vehicle power such as, inter alia, power level detection circuitry, GPS sensors, temperature sensors, pressure sensors, etc.). The memory system 8*a* may include a single memory system. Alternatively, the memory system 8*a* may include a plurality of memory systems. Vehicle 14*b* includes a memory system 8*b*, software 17*b*, and dedicated monitoring hardware 19*b* (all sensors and associated monitoring hardware for enabling software 17*b* to execute a process for replacing power source elements in a vehicle during operation of the vehicle power such as, inter alia, power level detection circuitry, GPS sensors, temperature sensors, pressure sensors, etc.). The memory system 8*b* may include a single memory system. Alternatively, the memory system 8*b* may include a plurality of memory systems. Network 7 may include any type of network including, inter alia, a local area network, (LAN), a wide area network (WAN), the Internet, a wireless network, etc.

The multiple compartment housings attached to vehicles 14*a* and 14*b* of system 100 may include power supply strength indicators (presenting a charge level percentage) for each receptacle to determine an order in which power source elements should be replaced or used for replacement (i.e., an order of replacement). Each multiple compartment housing may verify each time a power source element is installed (or used for installation) by detecting a power level and maintaining a discharge history for each power source element (e.g., a burn rate) to determine the order of replacement. GPS positioning data may be used to determine current location coordinates.

Figure 2:
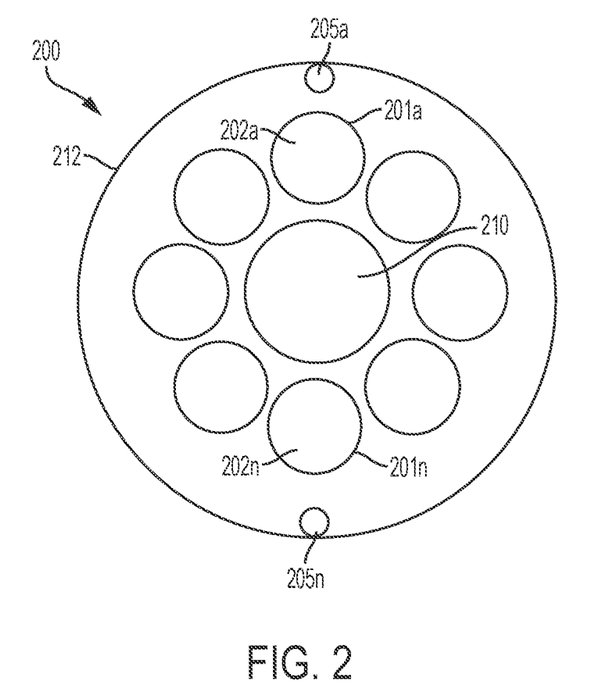
FIG. 2 illustrates a vehicle power source apparatus enabled by the system of FIG. 1 for accepting replacement power source elements in a vehicle during operation of the vehicle, in accordance with embodiments of the present invention.

FIG. 2 illustrates a vehicle power source apparatus 200 enabled by system 100 of FIG. 1 for accepting replacement power source elements in a vehicle during operation of the vehicle, in accordance with embodiments of the present invention. Vehicle power source apparatus 200 is associated with vehicle 14a of FIG. 1. Vehicle power source apparatus 200 comprises a multiple compartment housing 212 (configured to be physically attached to vehicle 14a of FIG. 1), power source elements 202a . . . 202n, and control hardware 210. Multiple compartment housing 212 comprises receptacles 201a . . . 201n retaining power source elements 202a . . . 202n for supplying power to a vehicle (e.g., vehicle 14a of FIG. 1). The multiple compartment housing is configured to be physically attached to a vehicle. Multiple compartment housing 212 may be positioned above a center mass of a vehicle (e.g., an aircraft) such that it may be attached to a bottom portion of the vehicle thereby preventing interference with moving parts such as propellers. Multiple compartment housing 212 may be aligned with a multiple compartment housing of another vehicle (e.g., multiple compartment housing 312 of FIG. 3 comprising replacement power source elements) via alignment holes 205a . . . 205n. A design of multiple compartment housing 212 enables a distribution of power source elements 202a . . . 202n to balance an associated weight such that not every receptacle requires a power source element. The power source elements 202a . . . 202n are retained within receptacles 201a . . . 201n and electrically connected to an input power coupler for electrical connection to the vehicle such that each power source element (or grouping of power source elements) is configured to supply power to the vehicle independently without requiring power supplied by any other power source element such that power source elements may be replaced during operation of the vehicle.

Control hardware 210 comprises specialized hardware configured to implement a process for accepting replacement power source elements for a vehicle during operation of the vehicle. Control hardware 210 comprises a controller connected to power source elements 202a . . . 202n, a communication interface, a charge strength percentage indicator, and a global positioning satellite (GPS) receiver. The controller is configured to monitor a power level of each power source element and generate a power level reading for each power level. The power level readings may be used to determine an order for replacement of each power source element. The order for replacement may be determined based on generated replacement data specifying a replacement history of each power source element. Additionally, the order for replacement may be determined based on generated discharge data specifying a rate of power discharge for each power source element. The controller is further configured to determine a replacement requirement action for replacing each power source element based on a remaining power charge level percentage determined from charge level readings for each power source elements.

The communication interface is communicatively coupled to the controller and an external system (e.g., external system 15 of FIG. 1). The communication interface is configured to retrieve each power level reading from the controller and transmit each power level reading to the external system. Additionally, the communication interface is configured to transmit a message indicating a replacement requirement action to the external system.

The charge strength percentage indicators are connected to each power source element in each receptacle to present a current charge level percentage reading for power source element.

The GPS receiver is communicatively connected to the controller and is configured to receive geographical coordinates from a satellite to determine (based on retrieved geographical coordinates) a current location for vehicle power source apparatus 200. The GPS receiver is further enabled too receive additional geographical coordinates from the satellite to determine a current location for a power source element replacement location for replacing each power source element. The current location is determined based on a current location for vehicle power source apparatus 200 and a predicted range for vehicle power source apparatus 200 and the f power source elements with respect to the current location for the power source replacement element. The controller may additionally determine an estimated time of arrival for vehicle power source apparatus 200 arriving at a power source replacement location based on the predicted range.

Figure 3:
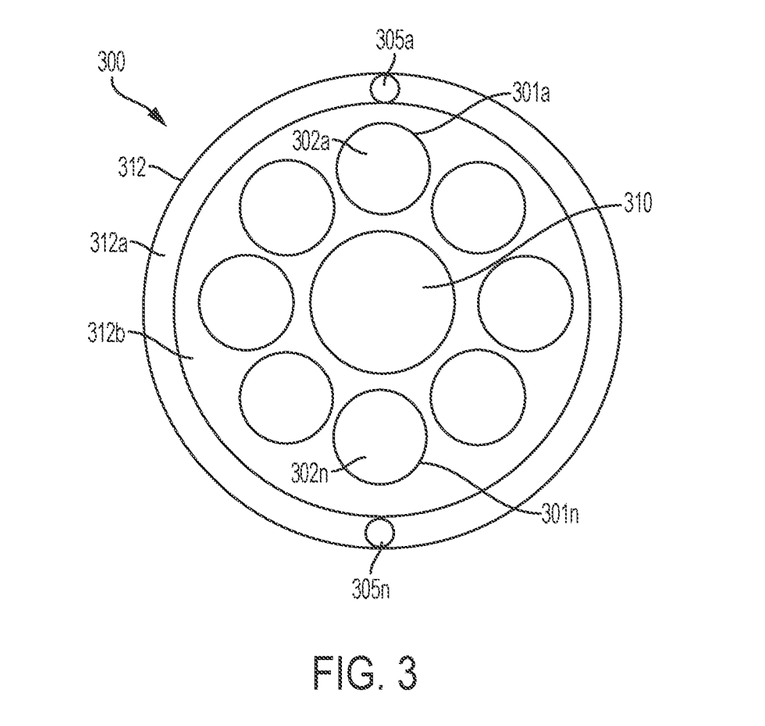
FIG. 3 illustrates a vehicle power source apparatus enabled by the system of FIG. 1 for replacing power source elements in a secondary vehicle during operation of the secondary vehicle, in accordance with embodiments of the present invention.

FIG. 3 illustrates a vehicle power source apparatus 300 enabled by system 100 of FIG. 1 for replacing power source elements in a secondary vehicle during operation of the secondary vehicle, in accordance with embodiments of the present invention. Vehicle power source apparatus 300 is associated with vehicle 14b of FIG. 1. Vehicle power source apparatus 300 comprises a multiple compartment housing 312 (comprising a fixed outer portion 312a and a rotating inner portion 312b), power source elements 302a . . . 302n, and control hardware 310. Multiple compartment housing 312 comprises receptacles 301a . . . 301n retaining replacement power source elements 202a . . . 202n for replacing power source elements for a vehicle (e.g., vehicle 14a of FIG. 1). The multiple compartment housing is configured to be physically attached to a vehicle. Multiple compartment housing 312 may be positioned above a center mass of a vehicle (e.g., an aircraft) such that it may be attached to a bottom or top portion of the vehicle thereby preventing interference with moving parts such as propellers. Multiple compartment housing 312 may be aligned with a multiple compartment housing of another vehicle (e.g., multiple compartment housing 212 of FIG. 2 comprising power source elements requiring replacement) via alignment holes 305a . . . 305n. A design of multiple compartment housing 312 enables a distribution of power source elements 302a . . . 302n to balance an associated weight such that not every receptacle requires a power source element. The power source elements 302a . . . 302n are retained within receptacles 301a . . . 301n and electrically connected to an input power coupler for electrical connection to the vehicle such that each power source element (or grouping of power source elements) is configured to supply power to the vehicle independently without requiring power supplied by any other power source element such that power source elements may be replaced during operation of the vehicle. Alternatively, an additional multiple compartment housing comprising additional power source elements for powering an associated vehicle thereby allowing multiple compartment housing 312 to use power source elements 302a . . . 302n for replacement power source elements only.

Control hardware 310 comprises specialized hardware configured to implement a process for replacing power source elements in a vehicle during operation of the vehicle. Control hardware 210 comprises a controller connected to power source elements 202a . . . 202n, a communication interface, and a global positioning satellite (GPS) receiver. The controller is configured to receive replacement commands and enable a rotation apparatus (e.g., a motor) to rotate rotating inner portion 312b such that a receptacle of receptacles 301a . . . 301n is directly aligned over an additional receptacle (e.g., of receptacles 201a . . . 201n of FIG. 2) of another vehicle requiring replacement of a discharged power source element with a fully charged power source element. Additionally, the controller is configured to monitor a power level of each power source element and generate a power level reading for each power level. The power level readings may be used to specify power source elements to be used as replacements.

The communication interface is communicatively coupled to control hardware 310 and an external system (e.g., external system 15 of FIG. 1). The communication interface is configured to retrieve commands and GPS coordinates associated with a vehicle requiring replacement power source elements. Additionally, the communication interface is configured to receive a message indicating a replacement requirement action from the external system.

The GPS receiver is communicatively connected to the controller and is configured to receive geographical coordinates from a satellite to determine (based on retrieved geographical coordinates) a current location for a vehicle power source apparatus requiring replacement power source elements. The GPS receiver is further enabled too receive additional geographical coordinates from the satellite to determine a current location for a power source element replacement location for replacing each power source element. The current location is determined based on a current location for a vehicle requiring replacement power source elements and an associated predicted range for power source elements with respect to the current location for the power source replacement element. The controller may additionally determine an estimated time of arrival for a vehicle power source apparatus arriving at a power source replacement location based on the predicted range.

Figure 4:
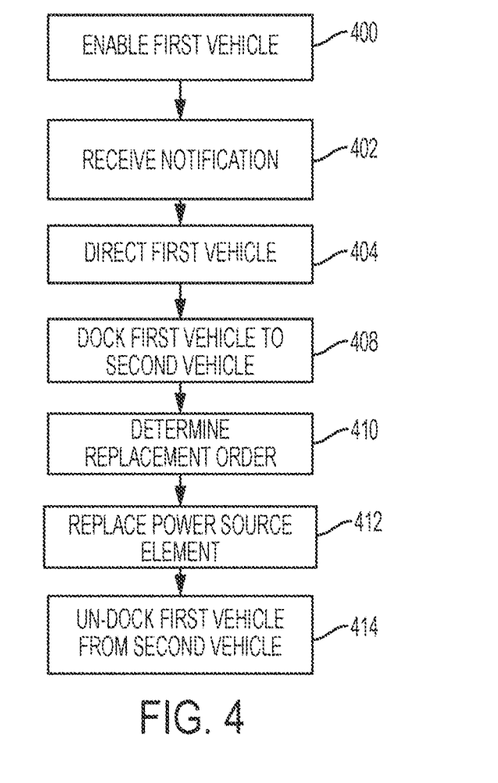
FIG. 4 illustrates a flowchart detailing a process enabled by the system of FIG. 1 for replacing power source elements in a vehicle during operation of the vehicle, in accordance with embodiments of the present invention.
Figure 5:
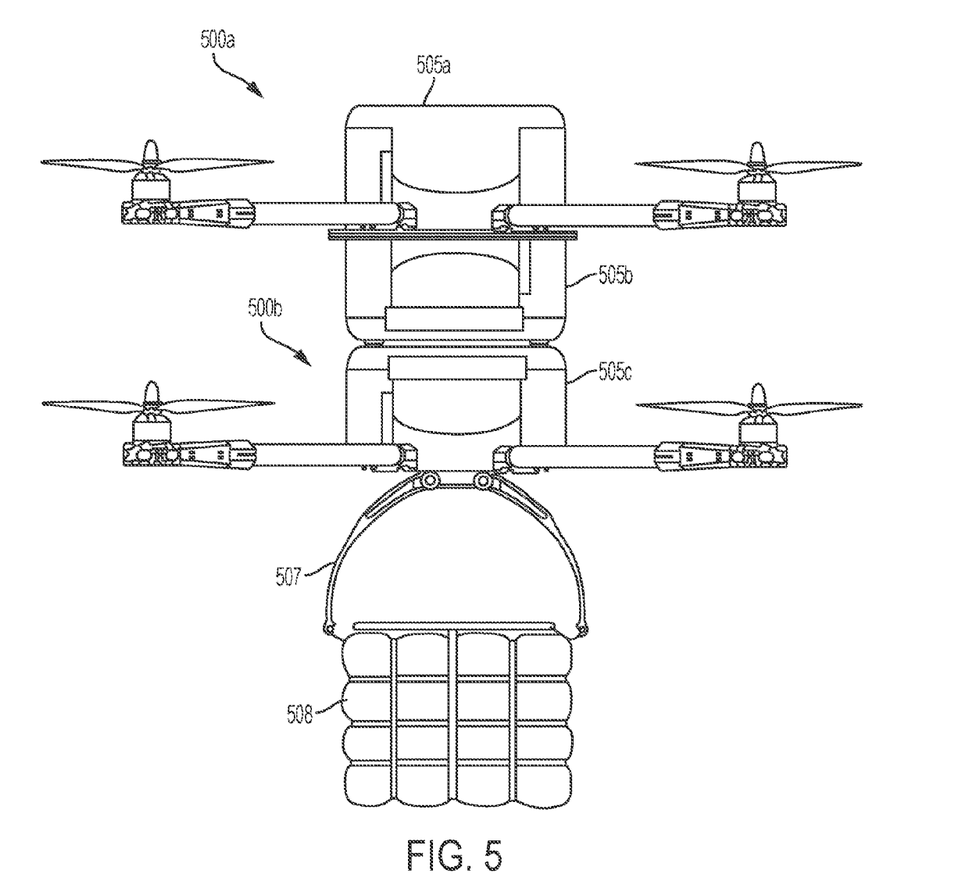
FIG. 5 illustrates a first vehicle docked to a second vehicle for replacement of power source elements, in accordance with embodiments of the present invention.

FIG. 4 illustrates a flowchart detailing a process enabled by system 100 of FIG. 1 for replacing power source elements in a vehicle during operation of the vehicle, in accordance with embodiments of the present invention. Each of the steps in the algorithm of FIG. 4 may be enabled and executed in any order by a computer processor(s) executing computer code. In step 300, a first vehicle (e.g., vehicle 14b of FIG. 1) is enabled (e.g., initiates flight). The first vehicle comprises a power source apparatus and a first power source apparatus (e.g., as illustrated in FIG. 5, infra) attached to the first vehicle. The power source apparatus comprises a plurality of power source elements configured to supply power to the first vehicle independently without requiring power supplied by any other power source element. The first power source apparatus comprises: a first multiple compartment housing (comprising a first plurality of receptacles retaining a first plurality of power source elements within the first plurality of receptacles), a controller connected to the first plurality of power source elements, and a communication interface communicatively coupled to the controller. Additionally, the first power source apparatus may comprise a rotation apparatus and the first multiple compartment housing may include a rotating portion comprised by the first multiple compartment housing. In step 402 the first vehicle receives a notification indicating that a second vehicle (e.g., vehicle 14a of FIG. 1) requires replacement of at least one power source element within a second power source apparatus of the second vehicle. The second power source apparatus comprises a second multiple compartment housing comprising a second plurality of receptacles retaining the second plurality of power sources within the second plurality of receptacles. The second plurality of power source elements supply power to the second vehicle independently without requiring power supplied by any other power source element. In step 404, the controller directs (in response to the notification) the first vehicle to a current location of the second vehicle. In step 408, the first vehicle is docked to the second vehicle. The docking process may include:

1. Aligning an alignment pin (an alignment mechanism) of the first multiple compartment housing directly over an alignment hole (an alignment mechanism) of the second multiple compartment housing.
2. Directing the first vehicle to said second vehicle such that the alignment pin is placed within the alignment hole.

In optional step 410, the controller determines (based on a received determined power level reading of the at least one power source element of the second vehicle, replacement data specifying a replacement history of the second plurality of power source elements, and discharge data specifying a rate of power discharge for each of the second plurality of power source elements) an order for replacement for the at least one power source element of the second vehicle with respect to each of the second plurality of power source elements. In step 412, the at least one power source element of second vehicle is replaced (during operation of the first vehicle and the second vehicle) with a fully charged power source element of the first plurality of power source elements from the first vehicle. The replacement process may include:

1. Rotating (by the rotation apparatus) the rotating portion such that a vacant receptacle of the first plurality of receptacles is directly aligned over a second receptacle (comprising the at least one power source element of said second vehicle) of the second plurality of receptacles.
2. Retrieving (by a power source replacement mechanism (e.g., a piston/solenoid assembly, a motor, an elongate member, etc.) of the first power source apparatus) the at least one power source element of the second vehicle from the second receptacle.
3. Placing (by the power source replacement mechanism) the said at least one power source element of the second vehicle within the vacant receptacle.
4. Rotating (by the rotation apparatus) the rotating portion such that a replacement receptacle of the first plurality of receptacles is directly aligned over the second receptacle of the second plurality of receptacles. The replacement receptacle includes the fully charged power source element.
5. Transferring (by the power source replacement mechanism) the fully charged power source element from the replacement receptacle to the second receptacle.

In step 414, the first vehicle is undocked from the second vehicle during operation of the first vehicle and the second vehicle.

FIG. 5 illustrates a vehicle 500a (i.e., representing vehicle 14b of FIG. 1) docked to a vehicle 500b (i.e., representing vehicle 14a of FIG. 1), in accordance with embodiments of the present invention. Vehicle 500a comprises an attached vehicle power source apparatus 505a and an attached vehicle power source apparatus 505b enabled by system 100 of FIG. 1 for replacing power source elements in vehicle 500b during operation (e.g., during flight) of vehicles 500a and 500b. Vehicle power source apparatus 505a comprises power source element(s) for supplying power for operation to vehicle 500a. Vehicle power source apparatus 505a comprises power source element(s) for supplying fully charged power source elements to vehicle 500b. Vehicle 500b comprises an attached vehicle power source apparatus 505c for supplying power for operation to vehicle 500b. Attached vehicle power source apparatus 505c is configured to receive fully charged power source elements from vehicle power source apparatus 505b. Vehicle 400 comprises a retaining mechanism 507 for retaining a package 508 for delivery.

FIG. 6 illustrates a configuration comprising a power source element 602 residing within a power source capsule 600, in accordance with embodiments of the present invention. Power source element 602 may comprise any type of battery residing in a power source capsule 600. Alternatively, power source element 602 and a power source capsule 600 in combination may comprise a single power source element or battery. Power source capsule 600 is configured to be placed within a receptacle of a multiple compartment housing (e.g., receptacle 201a of multiple compartment housing 212 of FIG. 2 or receptacle 301a of multiple compartment housing 312 of FIG. 3). Power source capsule 600 may comprise a visual indicator 621 (e.g., a lamp, an LED, etc.) indicting that power source element 602 is discharged and requires replacement. Power source capsule 600 may comprise a first portion 608 electro-magnetically or mechanically connected (at seam 610) to a second portion 611 such that first portion 608 may be raised from second portion 611 to allow for access to/replacement of power source element 602. A canonical (or any specialized) shape (i.e., as illustrated in FIG. 6) of power source capsule 600 (or a power source element itself) may facilitate replacement during operation of a vehicle (e.g., in flight). The specialized shape enables easy replacement of power source capsule 600 by eliminating issues associated with wind, vibrations, etc. Power source capsule 600 may be locked into place within a receptacle and a seal (e.g., an O-ring) may be used to create a weather-proof seal when power source capsule 600 is locked into place.

FIG. 7 illustrates a power source element/power source capsule 700, in accordance with embodiments of the present invention. Power source element/power source capsule 700 comprises mechanical actuators 704a and 704b for retrieving or removing power source element/power source capsule 700 from an associated receptacle for replacement. Mechanical actuators 704a and 704b may comprise, inter alia, a piston mechanism for automatically moving power source element/power source capsule 700 in directions 721 for replacement.

FIG. 8 illustrates a power source element/power source capsule 800, in accordance with embodiments of the present invention. Power source element/power source capsule 800 comprises mechanical actuators 804a and 804b for retrieving or removing power source element/power source capsule 800 from an associated receptacle for replacement. Mechanical actuators 804a and 804b may comprise, inter alia, mechanical resilient structures/devices such as chains, elongated members, etc. for automatically moving power source element/power source capsule 800 in directions 821 for replacement.

Figure 9:
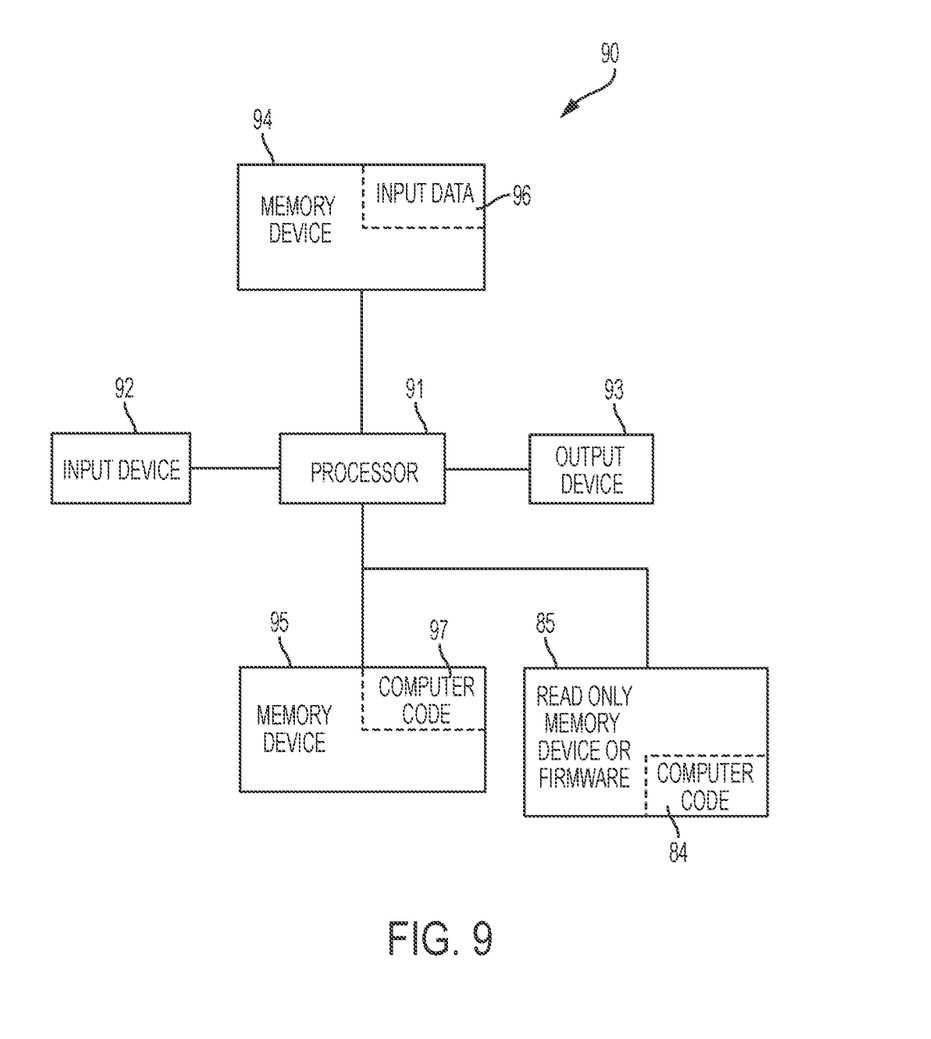
FIG. 9 illustrates a computer system used by the system of FIG. 1 for enabling a process for replacing power source elements in a vehicle during operation of the vehicle, in accordance with embodiments of the present invention.

FIG. 9 illustrates a computer system 90 (e.g., external system 15, vehicle control system 18, GPS system 21, vehicle 14a, and vehicle 14b of FIG. 1) used by or comprised by the system of FIG. 1 for enabling a process for replacing power source elements in vehicles during operation of vehicles 14, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 9 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for enabling a process for replacing power source elements in vehicles during operation of vehicles 14. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include the algorithm of FIG. 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 4) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to replace power source elements in vehicles during operation of the vehicles. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process f for replacing power source elements in vehicles during operation of the vehicles. In another embodiment, the invention provides a business method that performs the process steps of the invention on a subscription, advertising, and/or fee basis. That is, a service supplier, such as a Solution Integrator, could offer to enable a process for replacing power source elements in vehicles during operation of the vehicles. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of specialized hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicle power source replacement method comprising:
enabling a first vehicle comprising a power source apparatus and a first power source apparatus attached to said first vehicle,
wherein said power source apparatus comprises a plurality of power source elements configured to supply power to said first vehicle independently without requiring power supplied by any other power source element of said plurality of power source elements,
wherein said first power source apparatus comprises:
a first multiple compartment housing comprising a first plurality of receptacles retaining a first plurality of power source elements within said first plurality of receptacles,
a controller connected to said first plurality of power source elements, and
a communication interface communicatively coupled to said controller, and wherein each power source element of said first plurality of power source elements resides within a power source capsule comprising a tapered shape for placement within a receptacle:
receiving, by said first vehicle, a notification indicating that a second vehicle requires replacement of at least one power source element of a second plurality of power source elements within a second power source apparatus of said second vehicle, wherein said second plurality of power source elements supply power to said second vehicle independently without requiring power supplied by any other power source element of said second plurality of power source elements;
directing, by said controller in response to said notification, said first vehicle to a current location of said second vehicle;
docking said first vehicle to said second vehicle, wherein said docking said first vehicle to said second vehicle comprises:
aligning a first alignment mechanism of said first multiple compartment housing directly over a second alignment mechanism of said second multiple compartment housing, wherein said first alignment mechanism comprises a tapered pin comprising a tapered shape, and wherein said second alignment mechanism composes an alignment hole; and
directing said first vehicle to said second vehicle such that said taped pin is placed within said alignment hole causing said first alignment mechanism to be coupled to said second alignment mechanism; and
replacing, by said first vehicle during operation of said first vehicle and said second vehicle, said at least one power source element of said second vehicle with a fully charged power source element of said first plurality of power source elements from said first vehicle,
wherein said first power source apparatus comprises a rotation apparatus,
wherein said first multiple compartment housing composes a fixed outer portion and an inner rotating portion comprised by said first multiple compartment housing,
wherein said second power source apparatus comprises a second multiple compartment housing comprising a second plurality of receptacles retaining said second plurality of power source elements within said second plurality of receptacles, and wherein said replacing comprises:
rotating, by said rotation apparatus, said inner rotating portion such that a vacant receptacle of said first plurality of receptacles is directly aligned over a second receptacle of said second plurality of receptacles, said second receptacle comprising said at least one power source element of said second vehicle;
retrieving, by a power source replacement mechanism of said first power source apparatus, said at least one power source element of said second vehicle from said second receptacle;
placing, by said power source replacement mechanism, a tapered end of at least one power source capsule comprising said at least one power source element of said second vehicle within said vacant receptacle;
rotating, by said rotation apparatus, said inner rotating portion such that a replacement receptacle of said first plurality of receptacles is directly aligned over said second receptacle of said second plurality of receptacles, said replacement receptacle comprising said fully charged power source element; and
transferring, by said power source replacement mechanism via a tapered end of a first power source capsule comprising said fully charged power source element, said fully charged power source element from said replacement receptacle to said second receptacle;
determining, by said controller based on a received determined power level reading of said at least one power source element of said second vehicle, an order for replacement for said at least one power source element of said second vehicle with respect to each of said second plurality of power source elements; and
receiving, by said controller, discharge data specifying a rate of power discharge for each of said second plurality of power source elements, and wherein said order for replacement is further based on said discharge data.

2. The method of claim 1, further comprising:
undocking said first vehicle from said second vehicle during said operation of said first vehicle and said second vehicle.

3. The method of claim 1, further comprising:
receiving, by said controller, replacement data specifying a replacement history of said second plurality of power source elements, wherein said order for replacement is further based on said replacement data.

4. The method of claim 1, wherein said directing comprises:
receiving, by said controller, geographical coordinates for said current location of said second vehicle, and determining, by said controller based on said geographical coordinates, said current location.

5. A computer program product, comprising a computer readable hardware storage device storing a computer readable program code, said computer readable program code comprising an algorithm that when executed by a processor implements a vehicle power source replacement method, said method comprising:

enabling a first vehicle comprising a power source apparatus and a first power source apparatus attached to said first vehicle, wherein said power source apparatus comprises a plurality of power source elements configured to supply power to said first vehicle independently without requiring power supplied by any other power source element of said plurality of power source elements, wherein said first power source apparatus comprises: a first multiple compartment housing comprising a first plurality of receptacles retaining a first plurality of power source elements within said first plurality of receptacles, a controller connected to said first plurality of power source elements, and a communication interface communicatively coupled to said controller, and wherein each power source element of said first plurality of power source elements resides within a power source capsule comprising a tapered shape for placement within a receptacle:

receiving, by said first vehicle, a notification indicating that a second vehicle requires replacement of at least one power source element of a second plurality of power source elements within a second power source apparatus of said second vehicle, wherein said second plurality of power source elements supply power to said second vehicle independently without requiring power supplied by any other power source element of said second plurality of power source elements;

directing, by said controller in response to said notification, said first vehicle to a current location of said second vehicle;

docking said first vehicle to said second vehicle, wherein said docking said first vehicle to said second vehicle comprises:

aligning a first alignment mechanism of said first multiple compartment housing directly over a second alignment mechanism of said second multiple compartment housing, wherein said first alignment mechanism comprises a tapered pin comprising a tapered shape, and wherein said second alignment mechanism comprises an alignment hole; and directing said first vehicle to said second vehicle such that said taped pin is placed within said alignment hole causing said first alignment mechanism to be coupled to said second alignment mechanism; and replacing, by said first vehicle during operation of said first vehicle and said second vehicle, said at least one power source element of said second vehicle with a fully charged power source element of said first plurality of power source elements from said first vehicle, wherein said first power source apparatus comprises a rotation apparatus, wherein said first multiple compartment housing comprises a fixed outer portion and an inner rotating portion comprised by said first multiple compartment housing, wherein said second power source apparatus comprises a second multiple compartment housing comprising a second plurality of receptacles retaining said second plurality of power source elements within said second plurality of receptacles, and wherein said replacing comprises:

rotating, by said rotation apparatus, said inner rotating portion such that a vacant receptacle of said first plurality of receptacles is directly aligned over a second receptacle of said second plurality of receptacles, said second receptacle comprising said at least one power source element of said second vehicle;

retrieving, by a power source replacement mechanism of said first power source apparatus, said at least one power source element of said second vehicle from said second receptacle;

placing, by said power source replacement mechanism, a tapered end of at least one power source capsule comprising said at least one power source element of said second vehicle within said vacant receptacle;

rotating, by said rotation apparatus, said inner rotating portion such that a replacement receptacle of said first plurality of receptacles is directly aligned over said second receptacle of said second plurality of receptacles, said replacement receptacle comprising said fully charged power source element; and transferring, by said power source replacement mechanism via a tapered end of a first power source capsule comprising said fully charged power source element, said fully charged power source element from said replacement receptacle to said second receptacle;

determining, by said controller based on a received determined power level reading of said at least one power source element of said second vehicle, an order for replacement for said at least one power source element of said second vehicle with respect to each of said second plurality of power source elements; and receiving, by said controller, discharge data specifying a rate of power discharge for each of said second plurality of power source elements, and wherein said order for replacement is further based on said discharge data.

6. The computer program product of claim 5, wherein said method further comprises: undocking said first vehicle from said second vehicle during said operation of said first vehicle and said second vehicle.

7. The computer program product of claim 5, wherein said method further comprises:

receiving, by said controller, replacement data specifying a replacement history of said second plurality of power source elements, wherein said order for replacement is further based on said replacement data.

8. The computer program product of claim 5, wherein said directing comprises:

receiving by said controller, geographical coordinates for said current location of said second vehicle, and determining, by said controller based on said geographical coordinates, said current location.

* * * * *